(12) United States Patent
Imao

(10) Patent No.: US 12,063,450 B2
(45) Date of Patent: Aug. 13, 2024

(54) IMAGE PROCESSING APPARATUS, CONTROL METHOD, AND STORAGE MEDIUM

(71) Applicant: CANON KABUSHIKI KAISHA, Tokyo (JP)

(72) Inventor: Eiji Imao, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 72 days.

(21) Appl. No.: 17/885,281

(22) Filed: Aug. 10, 2022

(65) Prior Publication Data

US 2023/0054344 A1 Feb. 23, 2023

(30) Foreign Application Priority Data

Aug. 18, 2021 (JP) ................. 2021-133672

(51) Int. Cl.
*H04N 5/04* (2006.01)
*G06T 1/60* (2006.01)
*H04N 23/661* (2023.01)
*H04N 23/68* (2023.01)

(52) U.S. Cl.
CPC ................. *H04N 5/04* (2013.01); *G06T 1/60* (2013.01); *H04N 23/6811* (2023.01)

(58) Field of Classification Search
CPC ...... H04N 5/04; H04N 5/0733; H04N 9/8205; H04N 9/8042; H04N 21/242; H04N 23/661; H04N 23/6811; H04N 23/90; H04N 25/745; H04N 25/7795; G06T 1/60; G06T 9/00

USPC ... 348/471, 500, 222.1, 231.2, 231.6, 231.5, 348/312

See application file for complete search history.

(56) References Cited

U.S. PATENT DOCUMENTS

2021/0382931 A1* 12/2021 Fukada ................... G06F 16/51

FOREIGN PATENT DOCUMENTS

JP 2018007031 A 1/2018

\* cited by examiner

*Primary Examiner* — Sherrie Hsia
(74) *Attorney, Agent, or Firm* — Canon U.S.A., Inc. IP Division

(57) ABSTRACT

An apparatus generates an image file including a first region storing a plurality of instances of image data and a second region storing metadata. The metadata includes group information that groups image data shot synchronously with respect to time, the group information indicating image data belonging to a group, and indicator information that indicates an indicator of grouping for the group. The apparatus sets a reference indicating whether the image data has been shot synchronously with respect to time, determines whether the image data has been shot synchronously with respect to time, configures the group information grouping the image data to have been shot synchronously with respect to time, configures the indicator information including at least information of the reference, and generates the file storing the plurality of instances of image data, the group information, and the indicator information.

12 Claims, 10 Drawing Sheets

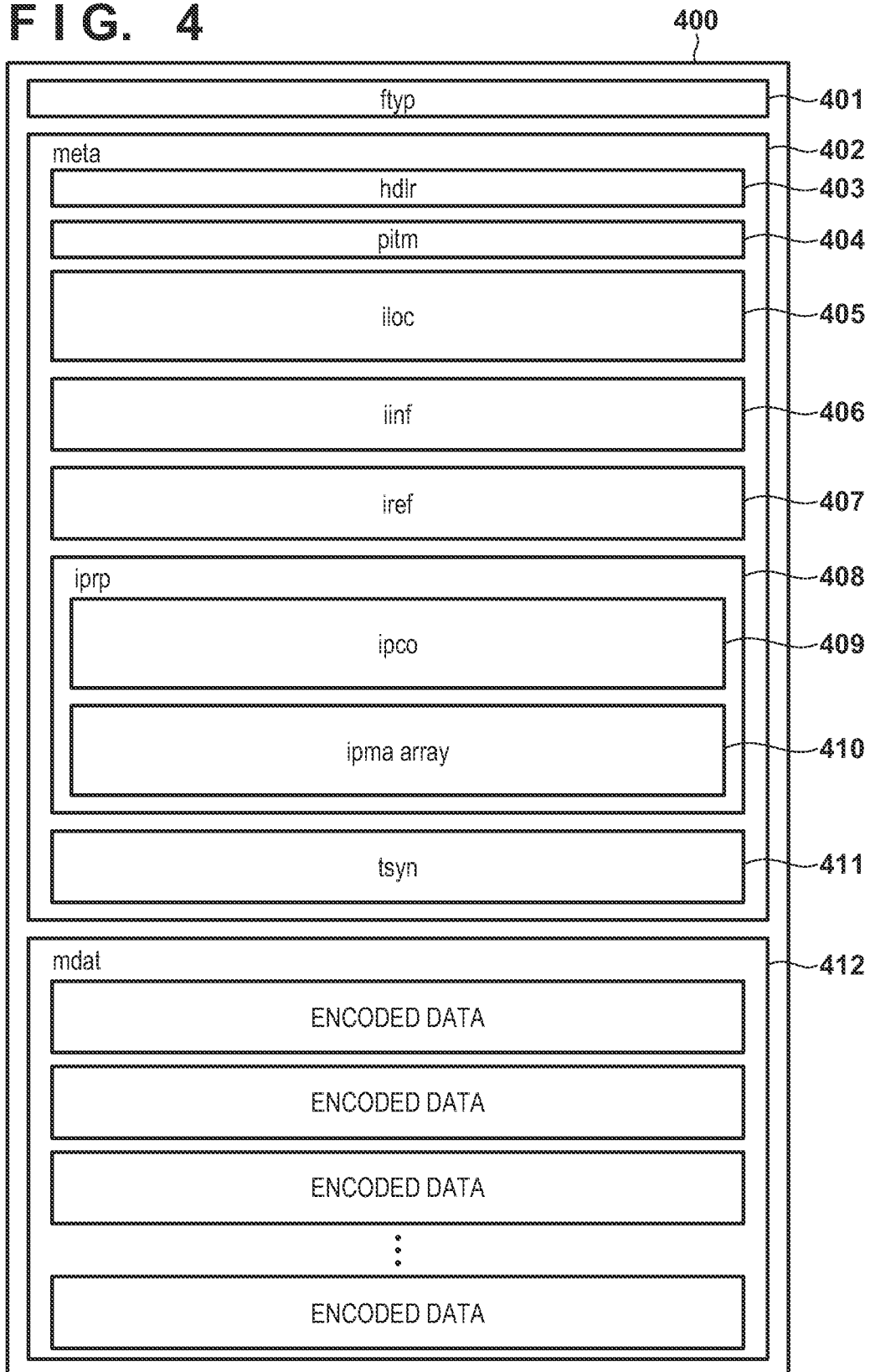

```
aligned(8) class TimeSynchronizedEntityToGroupBox
 extends EntityToGroupBox('tsyn', version, flags) { unsigned int(32) group_id;                              ⎫
        unsigned int(32) num_entities_in_group;                 ⎬ 502
        for(i=0; i<num_entities_in_group; i++)                  ⎪
                unsigned int(32) entity_id;                     ⎭

SynchronizedTimeMethod          method;      ⟩ 504     ⎫
                                                                ⎪
        SynchronizedCaptureTime         capt_time;   ⟩ 505     ⎬ 503
                                                                ⎪
        SynchronizedTimeDifference      diff_time;   ⟩ 506     ⎪
                                                                ⎪
        SynchronizedTimeCriteria        crtr_time;   ⟩ 507     ⎭
}
```

```
aligned(8) class ItemInfoBox
 extends FullBox('iinf', version, 0) { if (version == 0) {                                    ⎫
                unsigned int(16)     entry_count;              ⎬ 602
        } else {                                                ⎪
                unsigned int(32)     entry_count;              ⎭
        }
        ItemInfoEntry[ entry_count ]  item_infos;   ⟩ 603
}
```

FIG. 7

```
aligned(8) class ItemInfoEntry
 extends FullBox('infe', version=2, flags=0) { unsigned int(16)    item_ID;
        unsigned int(16)    item_protection_index;     } 702
        unsigned int(32)    item_type;
        string              item_name;

unsigned int(64)    item_ts_sec;               } 703
        unsigned int(32)    itme_ts_nsec;
}
```

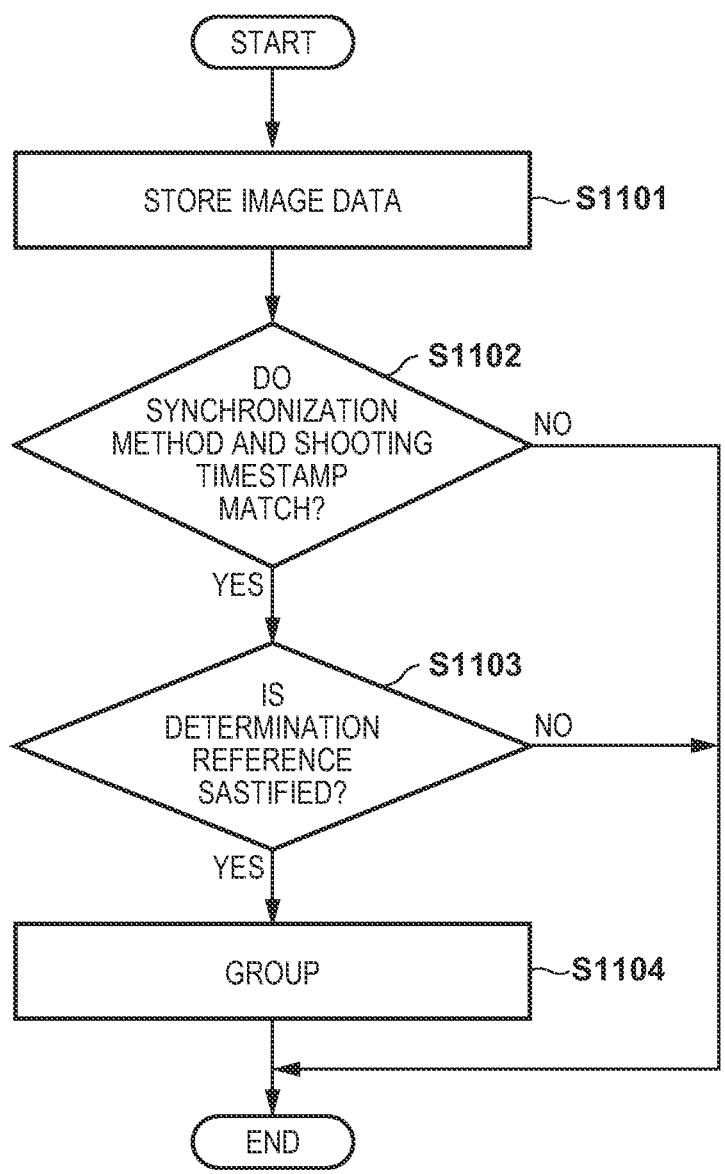

IMAGE PROCESSING APPARATUS, CONTROL METHOD, AND STORAGE MEDIUM

BACKGROUND OF THE DISCLOSURE

Field of the Disclosure

The present disclosure relates to an image processing apparatus, a control method, and a storage medium, and particularly relates to a technique for generating an image file capable of storing the data of a plurality of still images, moving images, and the like.

Description of the Related Art

Using captured images obtained at the same time makes it possible to, for example, present extended information that is not limited to the information contained in a single captured image. Japanese Patent Laid-Open No. 2018-007031 discloses a shooting system that shoots images with two cameras synchronized by an internal clock and generates a 3D image using one image shot by one camera and another image shot by the other camera at a time closest to the time the one image was shot.

In recent years, file formats exist which encode a plurality of still images or moving images and store the result as a single image file, which is expected to facilitate the management of highly-related image groups and the like. For example, a file format called High Efficiency Image File Format (HEIF), which is internationally standardized in ISO/IEC 23008-12, can store still images encoded in H.265 (HEVC) as a single image file. For such a file format, a normative structure that includes metadata is defined, which specifies the method for associating the metadata with stored images and the configuration of metadata in a specific format. Additionally, by writing in a metadata region, a single image representation constituted by a plurality of still images, called a "derived image", can be recorded as an image file.

As described in Japanese Patent Laid-Open No. 2018-007031, images in an image group obtained by synchronous shooting are highly interrelated, and if these images are grouped and stored as a synchronous group within a single image file, the convenience of displaying and processing the images is expected to improve. For HEIF, a standardization study is underway in ISO/IEC 23008-12:2017 FDAM2 to define an additional 'tsyn' group in the metadata, which indicates that a plurality of still images and moving images were obtained synchronously with respect to time.

However, no metadata configuration that takes into account the specific use of image files in which are stored image groups obtained by synchronous shooting has been proposed. The HEIF 'tsyn' was also considered to merely describe information that identifies an image group shot at the same time over the same period. It was therefore not conventionally envisioned, for such image files, to evaluate the simultaneity of the shooting of an image group that has been grouped as such an image file. For example, in cases such as generating 3D images as in Japanese Patent Laid-Open No. 2018-007031, where a plurality of images requiring simultaneous shooting are used for processing, the degree to which the image group were shot synchronously with respect to time cannot be determined.

SUMMARY OF THE DISCLOSURE

Having been achieved in light of the above-described circumstances, the present disclosure provides an image processing apparatus, a control method, and a storage medium that generate an image file which stores an image group shot synchronously and which can be used appropriately.

The present disclosure in its first aspect provides an image processing apparatus that generates an image file having a structure including a first storage region and a second storage region, the first storage region storing a plurality of instances of image data and the second storage region storing metadata pertaining to the plurality of instances of image data, wherein the metadata includes: synchronous group information that groups image data shot synchronously with respect to time, the synchronous group information indicating image data, among the plurality of instances of image data, belonging to a group created by the grouping; and indicator information that indicates an indicator of grouping for the group indicated by the synchronous group information, and the image processing apparatus comprises at least one processor and/or circuit configured to function as the following units: an obtainment unit configured to obtain the plurality of instances of image data and shooting information pertaining to shooting of the image data; a setting unit configured to set, for the plurality of instances of image data obtained by the obtainment unit, a determination reference indicating whether the image data has been shot synchronously with respect to time; a determination unit configured to determine, for each of the plurality of instances of image data obtained by the obtainment unit, whether the image data has been shot synchronously with respect to time, based on the shooting information pertaining to the image data and the determination reference set by the setting unit; a first configuration unit configured to configure the synchronous group information grouping the image data determined by the determination unit to have been shot synchronously with respect to time; a second configuration unit configured to configure the indicator information including at least information of the determination reference; and a generation unit configured to generate the image file storing the plurality of instances of image data obtained by the obtainment unit, the synchronous group information configured by the first configuration unit, and the indicator information configured by the second configuration unit.

The present disclosure in its second aspect provides an image processing apparatus that processes an image file having a structure including a first storage region and a second storage region, the first storage region storing a plurality of instances of image data and the second storage region storing metadata pertaining to the plurality of instances of image data, wherein the metadata includes: synchronous group information that groups image data shot synchronously with respect to time, the synchronous group information indicating image data, among the plurality of instances of image data, belonging to a group created by the grouping; and indicator information that indicates an indicator of grouping for the group indicated by the synchronous group information, the indicator information including information of a determination reference used in the grouping and indicating whether the image data has been shot synchronously with respect to time, and the image processing apparatus comprises at least one processor and/or circuit configured to function as the following units: an obtainment unit configured to obtain the image file to be processed; and a presenting unit configured to present synchronization accuracy of shooting, for the image data included in the group indicated by the synchronous group information, based on the information of the determination reference, the information of the determination reference being stored in the image file to be processed.

The present disclosure in its third aspect provides an image processing apparatus that processes an image file having a structure including a first storage region and a second storage region, the first storage region storing a plurality of instances of image data and the second storage region storing metadata pertaining to the plurality of instances of image data, wherein the metadata includes: synchronous group information that groups image data shot synchronously with respect to time, the synchronous group information indicating image data, among the plurality of instances of image data, belonging to a group created by the grouping; and indicator information that indicates an indicator of grouping for the group indicated by the synchronous group information, the indicator information including information of a determination reference used in the grouping and indicating whether the image data has been shot synchronously with respect to time and reference time information indicating a reference time of shooting of the image data included in the group, and the image processing apparatus comprises at least one processor and/or circuit configured to function as the following units: a first obtainment unit configured to obtain the image file to be processed; a second obtainment unit configured to obtain image data to be added to the first storage region of the image file to be processed and shooting information pertaining to shooting of the image data to be added; a determination unit configured to determine whether to add, to a group indicated by the synchronous group information, the image data to be added, based on the information of the determination reference and the reference time information of the image file to be processed and the shooting information of the image data to be added; a configuration unit configured to configure the synchronous group information based on a determination result from the determination unit; and a generation unit configured to generate a new image file by storing the image data to be added in the first storage region of the image file to be processed and storing the synchronous group information configured by the configuration unit in the second storage region.

The present disclosure in its fourth aspect provides a control method for an image processing apparatus that generates an image file having a structure including a first storage region and a second storage region, the first storage region storing a plurality of instances of image data and the second storage region storing metadata pertaining to the plurality of instances of image data, wherein the metadata includes: synchronous group information that groups image data shot synchronously with respect to time, the synchronous group information indicating image data, among the plurality of instances of image data, belonging to a group created by the grouping; and indicator information that indicates an indicator of grouping for the group indicated by the synchronous group information, and the control method comprises: obtaining the plurality of instances of image data and shooting information pertaining to shooting of the image data; setting, for the plurality of instances of image data obtained, a determination reference indicating whether the image data has been shot synchronously with respect to time; determining, for each of the plurality of instances of image data obtained, whether the image data has been shot synchronously with respect to time, based on the shooting information pertaining to the image data and the determination reference set in the setting; configuring the synchronous group information grouping the image data determined to have been shot synchronously with respect to time; configuring the indicator information including at least information of the determination reference; and generating the image file storing the plurality of instances of image data obtained, the synchronous group information, and the indicator information.

The present disclosure in its fifth aspect provides a control method for an image processing apparatus that processes an image file having a structure including a first storage region and a second storage region, the first storage region storing a plurality of instances of image data and the second storage region storing metadata pertaining to the plurality of instances of image data, wherein the metadata includes: synchronous group information that groups image data shot synchronously with respect to time, the synchronous group information indicating image data, among the plurality of instances of image data, belonging to a group created by the grouping; and indicator information that indicates an indicator of grouping for the group indicated by the synchronous group information, the indicator information including information of a determination reference used in the grouping and indicating whether the image data has been shot synchronously with respect to time, and the control method comprises: obtaining the image file to be processed; and presenting synchronization accuracy of shooting, for the image data included in the group indicated by the synchronous group information, based on the information of the determination reference, the information of the determination reference being stored in the image file to be processed.

The present disclosure in its sixth aspect provides a control method for an image processing apparatus that processes an image file having a structure including a first storage region and a second storage region, the first storage region storing a plurality of instances of image data and the second storage region storing metadata pertaining to the plurality of instances of image data, wherein the metadata includes: synchronous group information that groups image data shot synchronously with respect to time, the synchronous group information indicating image data, among the plurality of instances of image data, belonging to a group created by the grouping; and indicator information that indicates an indicator of grouping for the group indicated by the synchronous group information, the indicator information including information of a determination reference used in the grouping and indicating whether the image data has been shot synchronously with respect to time and reference time information indicating a reference time of shooting of the image data included in the group, and the control method comprises: obtaining the image file to be processed; obtaining image data to be added to the first storage region of the image file to be processed and shooting information pertaining to shooting of the image data to be added; determining whether to add, to a group indicated by the synchronous group information, the image data to be added, based on the information of the determination reference and the reference time information of the image file to be processed and the shooting information of the image data to be added; configuring the synchronous group information based on a result of the determining; and generating a new image file by storing the image data to be added in the first storage region of the image file to be processed and storing the synchronous group information in the second storage region.

The present disclosure in its seventh aspect provides a computer-readable storage medium in which is stored a program for causing a computer to function as the respective units of the image processing apparatus of the first aspect.

Further features of the present disclosure will become apparent from the following description of exemplary embodiments (with reference to the attached drawings).

BRIEF DESCRIPTION OF THE DRAWINGS

FIG. 4 is a diagram illustrating the file structure of an HEIF file.

FIG. 5 is a diagram illustrating an example definition of the data structure of a 'syn' box 411 according to the embodiment of the present disclosure.

FIG. 6 is a diagram illustrating an example definition of the data structure of an 'iinf' box 406 according to the embodiment of the present disclosure.

FIG. 7 is a diagram illustrating an example definition of the data structure of 'infe' according to the embodiment of the present disclosure.

FIG. 11 is a flowchart illustrating an example of processing involved in generating an HEIF file, executed by the synchronous shooting controller 100 according to the embodiment of the present disclosure.

DESCRIPTION OF THE EMBODIMENTS

Embodiment

Figure 1:
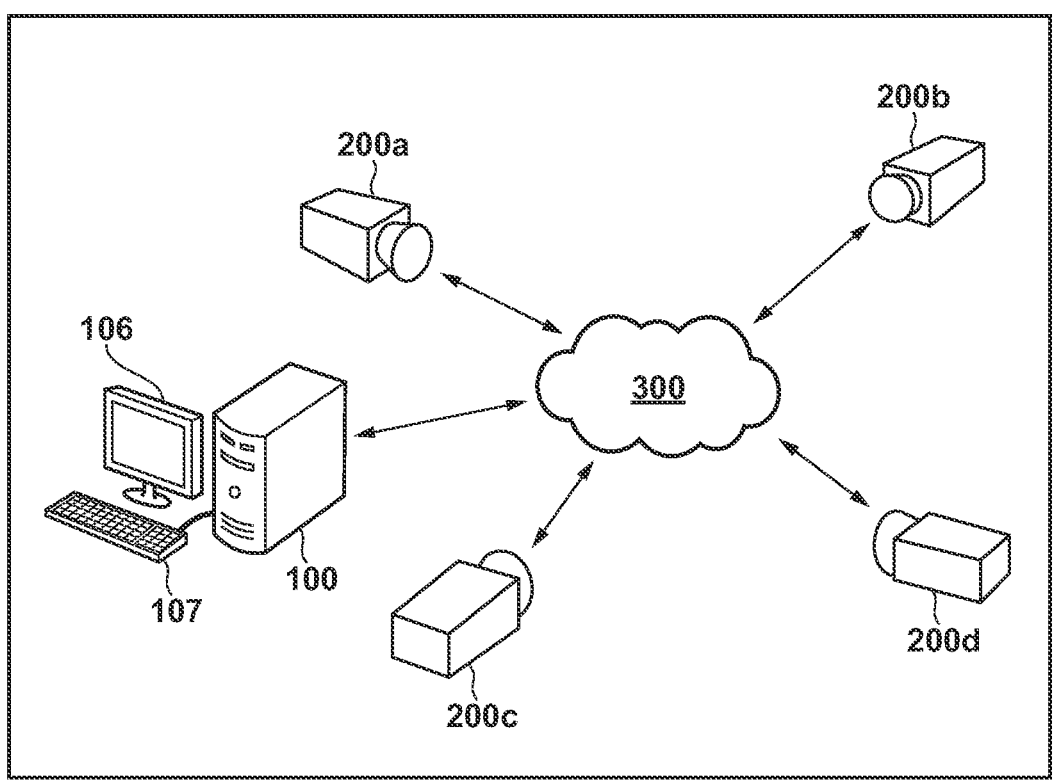
FIG. 1 is a diagram illustrating an example of the configuration of a synchronous shooting system according to an embodiment and a variation of the present disclosure.

Hereinafter, embodiments will be described in detail with reference to the attached drawings. Note, the following embodiments are not intended to limit the scope of the present disclosure. Multiple features are described in the embodiments, but limitation is not made to the present disclosure that requires all such features, and multiple such features may be combined as appropriate. Furthermore, in the attached drawings, the same reference numerals are given to the same or similar configurations, and redundant description thereof is omitted.

One embodiment, described below, will describe an example in which the present disclosure is applied in a synchronous shooting controller, serving as an example of an image processing apparatus, capable of obtaining image data shot by a plurality of camera devices communicatively connected over a network and generating image files. However, the present disclosure is applicable in any device capable of generating image files by obtaining image data and a shooting time according to a predetermined master clock at which the image data was shot.

In the present specification, "image data" may be any digital data expressing at least one images obtained by shooting, and may include still images, moving images, or both. "Image data" may be defined according to the file format of the image file generated by storing said image data, and is not limited to encoded data.

"(Shooting) synchronization accuracy" is a concept that quantifies the simultaneity of shooting for an image data group shot synchronously in terms of time. For example, in one aspect, the "synchronization accuracy" may be derived based on a difference in shooting timestamps between instances of image data. In another aspect, the "synchronization accuracy" may be derived based on a time difference between internal clocks in different devices when the devices shoot images having designated a shooting time. Or, in yet another aspect, the "synchronization accuracy" may be derived from a combination of such information.

The "shooting time"/"shooting timestamp" is a parameter that is associated with shot image data, and is determined based on the time information indicated by the internal clock (system timer) of an image capturing device when the image capturing device shot the image. On the other hand, "shooting timing" is a concept that indicates the point in time when shooting was performed in an absolute manner, independent of the internal clock of a single image capturing device, and is mentioned when necessary, particularly when shooting is performed by a plurality of image capturing devices and the results thereof are compared.

Configuration of Synchronous Shooting System

FIG. 1 is a schematic diagram illustrating an example of the configuration of a synchronous shooting system according to the present embodiment. The synchronous shooting system is constructed to enable a synchronous shooting controller 100 to record, as a single image file, image data obtained by a plurality of camera devices 200 working in tandem and taking time-synchronized shots. In the example illustrated in FIG. 1, the synchronous shooting controller 100 and four camera devices 200a to 200d are connected over a network 300, and are configured to send and receive information. In the present embodiment, the configuration is such that the synchronous shooting controller 100 issues shooting instructions, shooting processing is executed in each camera device 200, and the image data (encoded data) obtained from the shooting is sent back to the synchronous shooting controller 100.

Although there are four camera devices 200 in the present embodiment, it is easy to understand that the number of camera devices 200 is not limited in carrying out the present disclosure. Additionally, although the present embodiment will describe a configuration in which shooting units that capture a subject from four respective points are provided in the different camera devices 200, the present disclosure is not limited to such a configuration. For example, it goes without saying that a single camera device 200 may be provided with a plurality of shooting units. Furthermore, in the following, all four camera devices 200 are described as having the same functional configuration to facilitate understanding of the present disclosure, but it is to be understood that the present disclosure is not limited to such a configuration.

The network 300 may be a LAN, for example, or a public line such as the Internet. The connection between the network 300 and each device may be implemented by any method, whether wired or wireless.

Functional Configuration of Synchronous Shooting Controller

Figure 2:
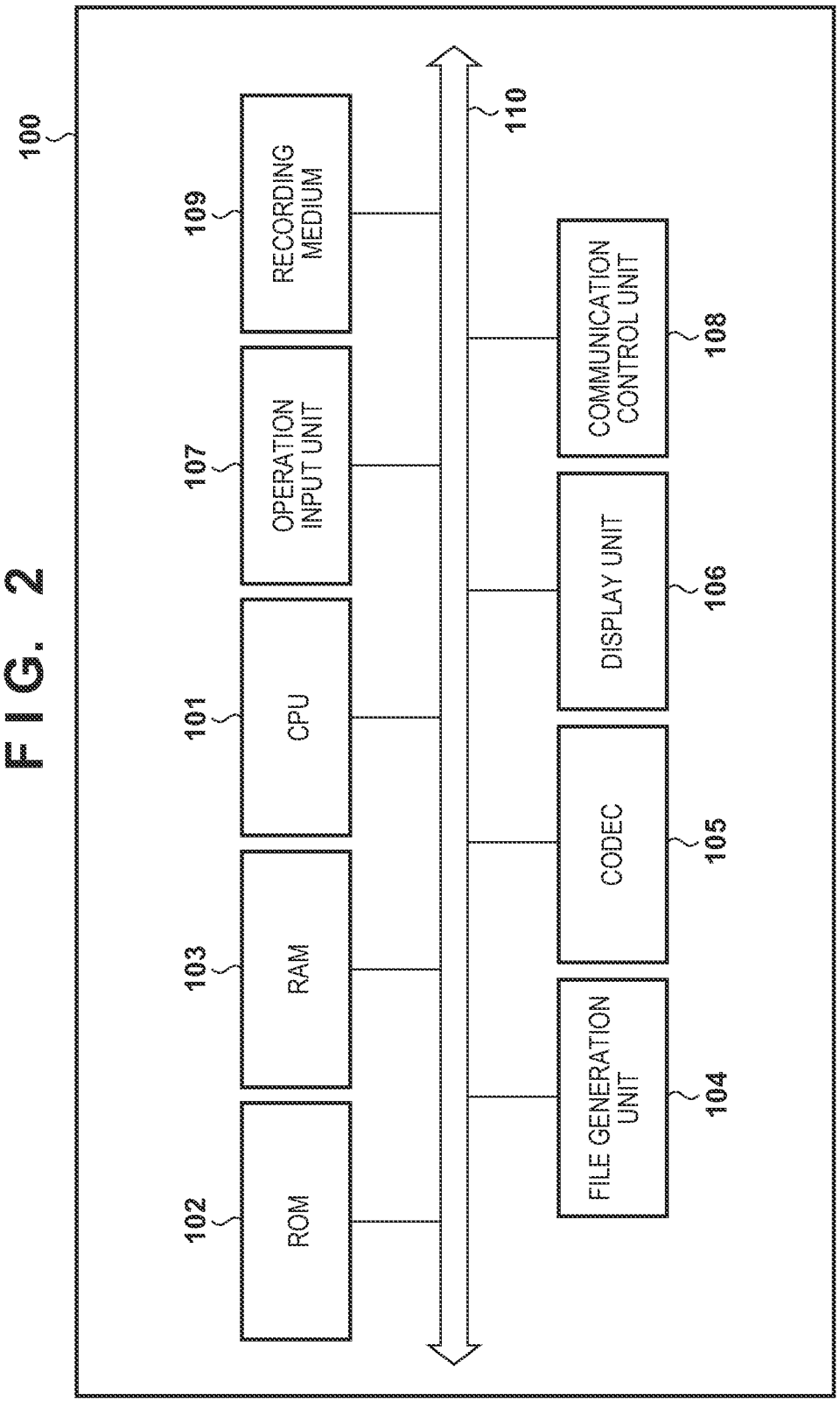
FIG. 2 is a block diagram illustrating an example of the functional configuration of a synchronous shooting controller 100 according to the embodiment and variation of the present disclosure.

FIG. 2 is a block diagram illustrating an example of the functional configuration of the synchronous shooting controller 100 according to the present embodiment. Each functional configuration is configured to be capable of transmitting information over a system bus 110.

Processing related to synchronous shooting by the plurality of camera devices 200 and the generation of image files storing a plurality of images obtained by the shooting, which is realized by the synchronous shooting system of the present embodiment, is realized by a CPU 101 executing a predetermined application program. This program, a system program involved in the operations of the synchronous shooting controller 100, and the like are stored in ROM 102, which is a nonvolatile storage device, and the CPU 101 reads out and loads the programs into RAM 103 to execute the programs. The RAM 103 is a temporary storage device and is used as a program loading area, a work area for the operations of each block, and the like. More specifically, the RAM 103 is also used as an input/output buffer for encoding and decoding performed by a codec 105 (described later) and as a data buffer for image file generation processing performed by a file generation unit 104. The ROM 102 also stores user setting data and the like of the synchronous shooting controller 100.

The file generation unit 104 performs processing involved in the generation, editing, and the like of image files. Image files that can be processed may include files in formats such as HEIF, JPEG, JPEG 2000, JPEG XR, WebP, MP4, MOV, AVI, WebM, and the like. The file generation unit 104 also performs processing for reading out encoded data (image data) from an image file stored in a recording medium 109 and transmitting the data to the codec 105 to be decoded.

The codec 105 is a video codec for moving images, still images, and the like, such as H.265 (HEVC), H.264 (AVC), AV1, JPEG, and so on. The codec 105 performs encoding and decoding processing for the data of still images, moving images, and the like handled by the synchronous shooting controller 100.

A display unit 106 is a display device, such as a liquid crystal display (LCD), that is configured integrally with the synchronous shooting controller 100 or is provided so as to be detachable from the synchronous shooting controller 100. In the present embodiment, the display unit 106 displays screens of an application related to synchronous shooting.

An operation input unit 107 includes a variety of user interfaces included in the synchronous shooting controller 100, such as operation buttons, switches, a mouse, a keyboard, and the like. In the case where the display unit 106 is a touch panel, the operation input unit 107 may include a touch panel sensor. Upon detecting that an operation input has been made in the user interface, the operation input unit 107 outputs a corresponding control signal to the CPU 101.

A communication control unit 108 is a network interface that connects to the network 300, and transmits and receives transmission frames. The communication control unit 108 may be, for example, a PHY and MAC (transmission media control processing) capable of wired LAN connection using Ethernet (registered trademark). Alternatively, if the synchronous shooting controller 100 is capable of connecting to a wireless LAN, the communication control unit 108 may include a controller which executes wireless LAN control such as IEEE 802.11a/b/g/n/ac/ax or the like, RF circuitry, and an antenna.

The communication control unit 108 also incorporates a hardware clock for PTP. As will be described in detail later, the synchronous shooting system according to the present embodiment performs time-synchronous communication using the Precision Time Protocol (PTP) specified in IEEE 1588-2008 (also called "IEEE 1588 version 2"). Because synchronous shooting is realized by having the plurality of camera devices 200 work together under the control of the synchronous shooting controller 100, the synchronous shooting controller 100 has the function of a PTP grand master clock (GMC). The PTP grand master clock function is implemented as software in the PTP stack executed by the CPU 101, and the time of a hardware clock built in the communication control unit 108 is used as a reference thereof. The communication control unit 108 is configured to be capable of outputting timestamps of the transmission and reception of transmission frames based on the time of the hardware clock.

The recording medium 109 is a non-volatile recording device having a large storage capacity, such as a hard disk device, an SD card, a Compact Flash (registered trademark) card, or the like. In the present embodiment, the recording medium 109 is used as the storage location for image files generated based on synchronous shooting.

Functional Configuration of Camera Devices

Figure 3:
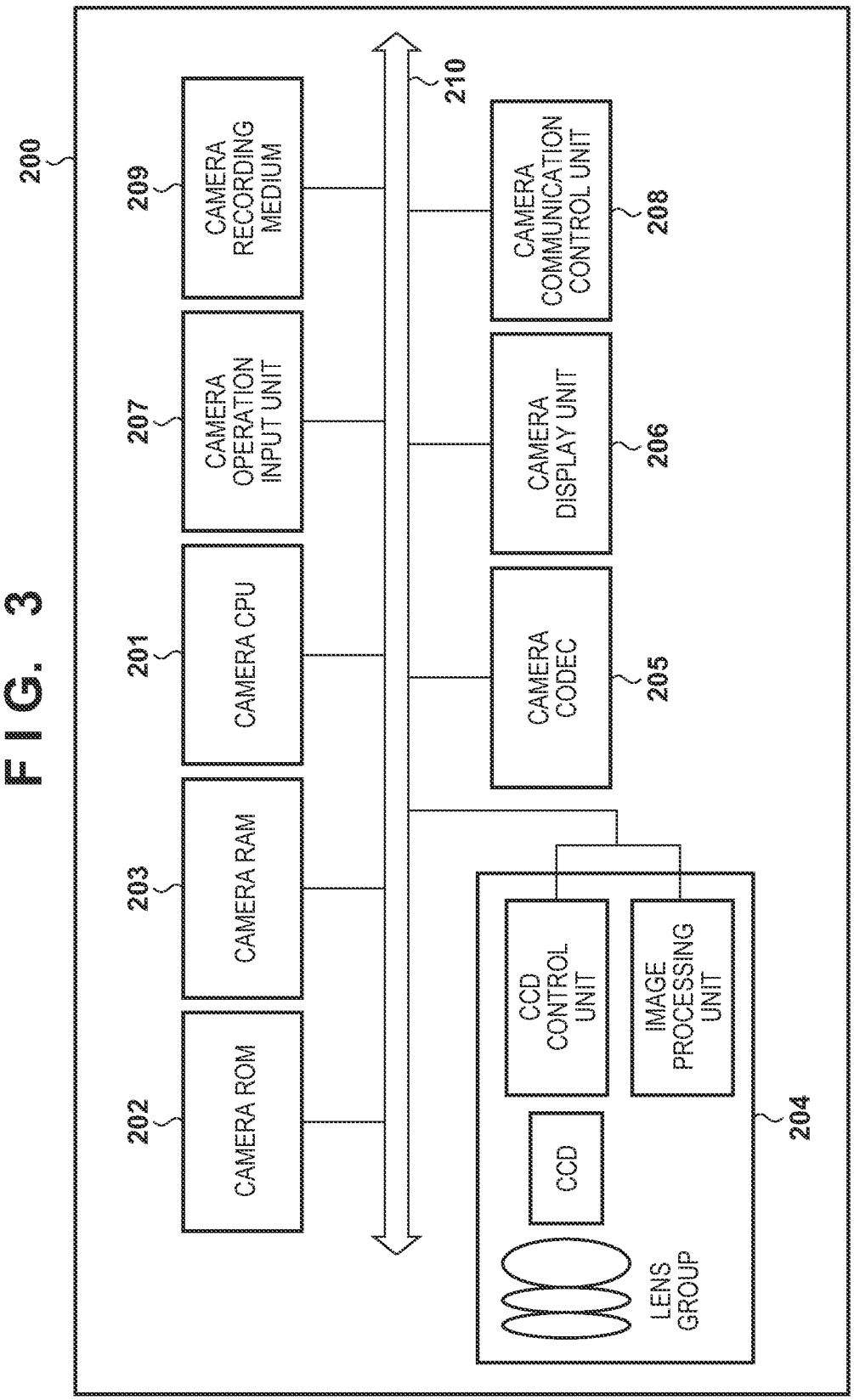
FIG. 3 is a block diagram illustrating an example of the functional configuration of a camera device 200 according to the embodiment and variation of the present disclosure.

An example of the functional configuration of each of the camera devices 200 according to the present embodiment will be described next with reference to the block diagram in FIG. 3. As illustrated in FIG. 3, each functional configuration in the camera device 200 is configured to be capable of transmitting information over a camera system bus 210. Note that of the functional configurations of the camera device 200, functional configurations having similar roles to the functional configurations of the synchronous shooting controller 100 are indicated by "camera" at the beginning to make a clear distinction.

Processing involved in time synchronization and shooting for the synchronous shooting is implemented by a camera CPU 201 executing a predetermined application program. This program, a system program involved in the operations of the camera device 200, and the like are stored in camera ROM 202, which is a nonvolatile storage device, and the camera CPU 201 reads out and loads the programs into camera RAM 203 to execute the programs. The camera RAM 203 is a temporary storage device and is used as a program loading area, a work area for the operations of each block, and the like. More specifically, the camera RAM 203 is also used as an input/output buffer involved in encoding and decoding performed by a camera codec 205 (described later). The camera ROM 202 also stores user setting data and the like for the camera device 200.

A shooting unit 204 is a unit having an image capturing function, and is configured including a lens group, a CCD (a photoelectric conversion element), a CCD control unit, and an image processing unit. The lens group is constituted by a plurality of lenses that optically form a subject image on an image capturing surface of the CCD. The CCD control unit includes a timing generator for supplying transfer clock signals, shutter signals, and the like to the CCD, circuits for noise removal, gain processing, and the like for output signals from the CCD, an A/D conversion circuit for converting analog signals to digital signals, and the like. The image processing unit performs image processing such as gamma conversion, color space conversion, white balance, exposure correction, and the like on the digital signals output from the CCD control unit, and outputs digital image signal data (image data) that can be encoded by the camera codec 205 to the RAM 203.

The camera codec 205 is a video codec for moving images, still images, and the like, such as H.265 (HEVC), H.264 (AVC), AV1, JPEG, and so on. The camera codec 205 performs encoding and decoding processing for the data of still images, moving images, and the like handled by the camera device 200.

A camera display unit 206 is a display device, such as a liquid crystal display (LCD), that is configured integrally with the camera device 200 or is provided so as to be detachable from the camera device 200. In the present embodiment, the camera display unit 206 displays screens of an application related to synchronous shooting.

A camera operation input unit 207 includes a variety of user interfaces included in the camera device 200, such as operation buttons, switches, and the like. In the case where the camera display unit 206 is a touch panel, the camera operation input unit 207 may include a touch panel sensor. Upon detecting that an operation input has been made in the user interface, the camera operation input unit 207 outputs a corresponding control signal to the camera CPU 201.

A camera communication control unit 208 is a network interface that connects to the network 300, and transmits and receives transmission frames. The camera communication control unit 208 may be, for example, a PHY and MAC (transmission media control processing) capable of wired LAN connection using Ethernet (registered trademark). Alternatively, if the camera device 200 is capable of connecting to a wireless LAN, the camera communication control unit 208 may include a controller which executes wireless LAN control such as IEEE 802.11a/b/g/n/ac/ax or the like, RF circuitry, and an antenna.

The camera communication control unit 208 also incorporates a hardware clock for PTP. In the synchronous shooting system according to the present embodiment, the camera device 200 has the function of a PTP slave. The PTP slave function is implemented as software in the PTP stack executed by the camera CPU 201, and synchronizes the hardware clock built into the camera device 200 based on the time information supplied from the synchronous shooting controller 100. Time synchronization is then performed by synchronizing the time of a system timer of the operating system of the camera device 200, executed by the camera CPU 201, with the hardware clock of the camera device 200. The camera communication control unit 208 is configured to be capable of outputting timestamps of the transmission and reception of transmission frames based on the time of the built-in hardware clock.

A camera recording medium 209 is a non-volatile recording device having a large storage capacity, such as a hard disk device, an SD card, a Compact Flash (registered trademark) card, or the like. In the present embodiment, the camera recording medium 209 may be used to store image data such as still images, moving images, and the like obtained by shooting.

Synchronous Shooting

The following will describe synchronous shooting performed by the synchronous shooting system according to the present embodiment and the generation of a single image file containing a plurality of instances of image data obtained through the synchronous shooting.

As described above, in the synchronous shooting system according to the present embodiment, the times of the system timers (internal clocks) of each device in the synchronous shooting system are synchronized through time-synchronous communication using the synchronous shooting controller 100 as the grand master clock. Moreover, being supplied with the shooting time from the synchronous shooting controller 100, each camera device 200 shoots an image when the corresponding system timer reaches the corresponding shooting time. The image data obtained from the shooting is sent to the synchronous shooting controller 100, and the synchronous shooting controller 100 receives the plurality of instances of image data shot at the specified shooting time, stores the data in a single image file, and records the data. At this time, the plurality of instances of image data can be regarded as image data taken synchronously in terms of time, and are grouped in the corresponding image file as having been shot synchronously. The grouping may be implemented by, for example, writing an identifier of the grouped image data in the metadata of the image file.

Here, the file format of the image file may be any format that stores a plurality of instances of image data and has metadata that describes the image data shot synchronously as being grouped, but the following will describe a case where the file format is HEIF.

HEIF File Structure

The file structure of an HEIF file will be described with reference to FIG. 4. As illustrated in FIG. 4, an HEIF file 400 is generally constituted by the following three boxes (storage regions). The first is a FileTypeBox ('ftyp') 401, which stores a brand name for a reader of the HEIF file 400 to identify the specifications of the file. In the HEIF file 400 generated by the synchronous shooting controller 100 according to the present embodiment, 'miff' is assumed to be set as the brand name and 'heic' is assumed to be set as a compatible brand name in the 'ftyp' box 401. The second is a MetaBox ('meta') 402, which stores metadata describing various information about the image data stored in the HEIF file 400. As illustrated in FIG. 4, the 'meta' box 402 stores a plurality of types of information pertaining to the image data, each separated into different boxes, which will be described in detail below. The third is a MediaDataBox ('mdat') 412, which stores a plurality of instances of encoded data (image data) as image items. Note that in the following descriptions, the encoded data stored in the 'mdat' box 412 will be referred to as "image item" or "image data" with different wording as appropriate.

A HandlerReferenceBox ('hdlr') 403 stores a declaration of a handler type for analyzing the structure of the 'meta' box 402. In the HEIF file 400 generated by the synchronous shooting controller 100 according to the present embodiment, it is assumed that all the encoded data to be stored is still images, and a handler type name 'pict' is set in the 'hdlr' box 403.

A PrimaryItemBox ('pitm') 404 specifies an identifier (item ID) of the encoded data serving as a representative item among the image items stored by the HEIF file 400.

An ItemLocationBox ('iloc') 405 stores information indicating the storage location of the data for each image item in the HEIF file 400. The 'iloc' box 405 typically describes the storage location of the image item as a byte offset from the beginning of the HEIF file 400 and a data length from that beginning. In other words, the information in the 'iloc' box 405 can identify the location of each instance of encoded data stored in the 'mdat' box 412.

An ItemInfoBox ('iinf') 406 defines basic information about all the image items in the HEIF file 400, including the item ID, an item type indicating the type of the item, an item name, and the like.

An ItemReferenceBox ('iref') 407 stores information describing associations among image items in the HEIF file 400. The 'iref' box 407 is used to describe associations between an image item and shooting information (Exif data and the like) items thereof, in a situation where the image item is a shot image. In a situation where a plurality of image items are in a derived image relationship, the box is used to describe the associations among the image items.

An ItemPropertiesBox ('iprp') 408 stores various attribute information about the image items contained in the HEIF file 400. More specifically, the 'iprp' box 408 contains an ItemPropertyContainerBox ('ipco') 409 describing the attribute information and an ItemPropertyAssociation ('ipma') box 410 array (Array) indicating associations among the attribute information and each image item. The 'ipco' box 409 may store an enumeration of data such as, for example, a creation date/time of the image item, information indicating the width and height of the image item in pixels, an HEVC parameter set required to decode the HEVC image item, and the like. On the other hand, the 'ipma' box 410 indicates an association for each instance of attribute information stored in the 'ipco' box 409, e.g., by storing the item ID of the corresponding image item. Here, if a plurality of image items correspond to the same attribute information, this may be described in a single 'ipma' box 410.

TimeSynchronizedEntityToGroupBox ('tsyn') 411 stores information indicating a group defined by grouping image items shot synchronously with respect to time (a synchronous group). The information stored in the 'tsyn' box 411 may be in the form of a list of item IDs, for example, for one synchronous group, and may include at least information that can identify the image items included in the group. Note that for one HEIF file 400, a plurality of synchronous groups may be defined, and the 'tsyn' box 411 may store as many synchronous groups as there are 'meta' boxes 402.

Note that the file structure of the HEIF file 400 illustrated in FIG. 4 is merely one example, and the storage order of each box, the manner of separation of the storage regions, and the types of stored information are not limited thereto.

Incidentally, as mentioned above, in conventional HEIF files, the 'tsyn' box 411 is simply a grouping of image data shot at the same time over the same period of time, and is not a configuration intended to be used in this manner.

For example, when adding new image data to an HEIF file, it was not possible to determine whether the new image data could be added to the synchronous group defined in the 'tsyn' box 411, and the extensibility of the synchronous group could not be ensured. In other words, when image data was added at a different timing from than when the HEIF file was generated, it was difficult to determine whether the image data could be "image data shot at the same time over the same period of time" as the image data already stored in the synchronous group.

In addition, it is difficult to completely synchronize the system timers between devices even if time-synchronous communication is used, especially when image data shot by a plurality of different camera devices are stored in HEIF files, as in the present embodiment. This depends, for example, on the constantly-fluctuating difference between the time of the system timer (a reference time) of the synchronous shooting controller 100, which is the grand master clock, and the times of the system timers of the camera devices 200 to be synchronized. In other words, even if a shooting time is specified after time synchronization and each of the camera devices 200 shoots an image at that time, there can still be error in the timings of shooting among the camera devices. Therefore, depending on the intended use of the plurality of instances of image data in a synchronous group of HEIF files, error in the shooting timing among the image data may make the data unsuitable for use. For example, applications that generate 3D images, such as Japanese Patent Laid-Open No. 2018-007031, require greater synchronization accuracy in shooting than applications that simply view image data shot at the same time. In this manner, depending on the intended use of image data shot synchronously, the required synchronization accuracy of shooting will vary, for example, from error of several milliseconds or less to error of several microseconds or less. Accordingly, simply grouping and describing image data shot simultaneously over the same period of time has not been sufficient for determining whether the image data contained in one synchronous group meets the required conditions for synchronization accuracy in shooting. In other words, when using a plurality of instances of image data contained in a synchronous group in an HEIF file, it has been difficult to determine whether the plurality of instances of image data ensure the synchronization accuracy of shooting for the intended use. In other words, it has been difficult to determine the extent to which a plurality of instances of image data in a synchronous group were taken synchronously with respect to time.

In view of this type of file use, a new way of configuring the 'meta' box 402, which makes it possible to easily evaluate the synchronization accuracy of image data included in a synchronous group, will be described for the synchronous shooting controller 100 according to the present embodiment. To be more specific, in the framework of the file structure of the HEIF file 400 illustrated in FIG. 4, the present embodiment defines the data structure of the 'tsyn' box 411 and the data structure of the 'iinf' box 406 so as to include information for evaluating the synchronization accuracy for the synchronous group.

FIG. 5 indicates a definition 501 of the data structure of the 'tsyn' box 411 for the HEIF file according to the present embodiment. As indicated in definition 501, the 'tsyn' box 411 according to the present embodiment, for one synchronous group, contains synchronous group information 502 that identifies the grouped image items and indicator information 503 indicating the synchronization accuracy of the image data shooting for that group.

The synchronous group information 502 describes, for example, a list of group IDs (group_id), which are identifiers of synchronous groups, the number of entries in the group (num_entities_in_group), and entry IDs (entity_id), as illustrated in FIG. 5. Here, the entry ID is assumed to specify the item ID of the image item stored in the HEIF file. In other words, the synchronous group information 502 is information that identifies the image data, among the image data stored in the 'mdat' box 412, that is grouped together as having been taken synchronously with respect to time, as conventionally assumed.

On the other hand, it is desirable that the indicator information 503, which indicates the synchronization accuracy of the shooting, be configured to enable a variety of determinations not limited to when the HEIF file is generated, assuming future forms of use not limited within the HEIF file synchronous shooting system. Accordingly, the indicator information 503 according to the present embodiment is configured including synchronization method information 504, reference time information 505, synchronization error information 506, and permissible error information 507.

The synchronization method information 504 describes information that identifies the time synchronization method used for the devices that shot the image data included in the synchronous group. Specifically, the synchronization method information 504 may be information that specifies a compatible time synchronization standard, protocol, or the like. In addition, the synchronization method information 504 may include information specific to the time synchronization standard, protocol, or the like. For example, when a synchronous group is constituted by image data shot by the synchronous shooting system according to the present embodiment, the information may be information indicating IEEE 1588-2008, which is the time synchronization standard, and that the grand master clock is the synchronous shooting controller 100.

The reference time information 505 describes information that identifies a time serving as a reference for the synchronous shooting (a reference time) for the image data included in the synchronous group. When the synchronous group is constituted by image data shot by the synchronous shooting system according to the present embodiment, the reference time information 505 may be, for example, information indicating a specified shooting time (a shooting timestamp or time) supplied from the synchronous shooting controller 100 to each camera device 200.

The synchronization error information 506 describes information expressing the state of synchronization error among the devices that shot the image data included in the synchronous group. In other words, the synchronization error information 506 describes information indicating the simultaneity of the shooting for the image data included in the synchronous group. The "synchronization error" is time deviation of the system timers of the camera devices 200 from the grand master clock, for example, when PTP, NTP, or the like is used for time synchronization. In the present embodiment, synchronous shooting is performed by supplying the specified shooting time, and thus the synchronization error of the camera device 200 indicates a time difference of the shooting timing of the image data from the specified shooting time. Thus in the present embodiment, to objectively express the simultaneity of shooting for the image data included in the synchronous group, the synchronization error information 506 is assumed to indicate a maximum value among the synchronization errors of the camera devices 200 which shot the image data in the group. However, the implementation of the present disclosure is not limited thereto, and the synchronization error information 506 may be a maximum value of the time deviation of the system timers among the camera devices 200 that shot the image data included in the synchronous group. In other words, the synchronization error information may be the time difference between the earliest and the latest of the times that indicate the shooting timing of the image data included in the synchronous group, on a time axis of the grand master clock reference.

The permissible error information 507 describes, for image data that can be included in the synchronous group, information indicating a permissible range of the synchronization error of the devices that shot the image data, or more specifically, information indicating a time range that is considered to be synchronized when grouping the data. In other words, the permissible error information 507 describes information indicating the minimum level at which simultaneity of the shooting for the image data included in the synchronous group is ensured. In other words, the permissible error information 507 describes information that serves as a determination reference for determining whether the plurality of instances of image data have been shot in synchronization with respect to time at the time of the grouping, i.e., whether the image data are permitted to be included in the synchronous group. In the present embodiment, the permissible error information 507 is assumed to indicate the determination reference in the form of a permissible upper limit value of the synchronization error of the camera devices 200, i.e., an upper limit value of the time difference of the shooting timing of the image data from the specified shooting time. In other words, the permissible error information 507, when combined with the reference time information 505, defines a time range that is considered to be synchronized, with respect to time, relative to the specified shooting time. However, the implementation of the present disclosure is not limited thereto, and the permissible error information 507 may be a permissible upper limit value of the time deviation of the system timers among the camera devices 200 that shot the image data that can be included in the synchronous group. As will be described in detail later, the information described in the permissible error information 507 is determined based on the intended use of the file, and the options for the synchronization accuracy to be ensured, and the like, which are specified, for example, when performing the processing involved in HEIF file generation in the synchronous shooting controller 100.

In other words, while the synchronization error information 506 is information indicating the synchronization accuracy of shooting that is finalized based on the image data included in the synchronous group, the permissible error information 507 is information indicating the synchronization accuracy of shooting that is fixed for the synchronous group. Accordingly, for the plurality of instances of image data included in a synchronous group, the minimum synchronization accuracy of shooting specified by the permissible error information 507 is guaranteed, and a more specific synchronization accuracy is indicated by the synchronization error information 506.

By defining the data structure of the 'tsyn' box 411 in this manner, it is possible to know the synchronization accuracy of the shooting of the corresponding synchronous group by referring to the indicator information 503 when using the HEIF file. To be more specific, the synchronization method information 504 and reference time information 505 enable to understand that image data shot at the specified shooting time is grouped together in devices that are time-synchronized through specific time-synchronous communication. Additionally, by referring to the synchronization error information 506, the maximum value of the time difference from the specified shooting time of the image data included in the synchronous group can be obtained, and the synchronization accuracy of the shooting can be ascertained. Alternatively, by referring to the permissible error information 507, the upper limit value of the time difference from the specified shooting time of the image data that can be included in the synchronous group can be obtained, and the synchronization accuracy for the synchronous group can be ascertained. In other words, the indicator information 503 has not only the aspect of indicating the synchronization accuracy of the shooting of the image data in the synchronous group, but also the aspect of expressing an indicator of the grouping of the image data for that synchronous group.

In a synchronous shooting system that generates HEIF files using image data obtained by supplying the specified shooting time from the synchronous shooting controller 100, as in the present embodiment, the shooting timestamps of the obtained image data are identical. In other words, because the system timer of each camera device 200 after the time-synchronous communication indicates that images are to be shot at the specified shooting time, the shooting timestamp attached to the image data shot by each camera device 200 indicates the specified shooting time. On the other hand, the shooting timing among the camera devices 200 can vary depending on the state of the synchronization error of the system timers, even if the specified shooting time is the same. Accordingly, in the synchronous shooting system according to the present embodiment, when image data is provided by each of the camera devices 200, information on the synchronization error of the system timers of the camera devices 200 (device error information) is assumed to be sent in association with the image data. Then, in the synchronous shooting controller 100, the 'tsyn' box 411 (the synchronous group information 502 and the indicator information 503) of the HEIF file is configured based on the shooting timestamps and the device error information of the image data. Although the present embodiment describes the device error information has being derived in each of the camera devices 200, the implementation of the present disclosure is not limited thereto, and may be derived in at least one of the synchronous shooting controller 100 and the camera devices 200.

On the other hand, considering the extensibility of the synchronous group, it is preferable that the HEIF file be configured such that image data shot without supplying a specified shooting time, by a camera device time-synchronized through the same method as the devices in the synchronous shooting system, can be added. In other words, it is preferable that the HEIF file be configured such that synchronous groups can be defined without being limited to image data shot synchronously having specified the shooting time. Because the simultaneity of shooting pertaining to a synchronous group can be measured if it is possible to compare the shooting timings on a common time axis for the plurality of camera devices 200 that shoot the image data, grouping is possible even for image data obtained without controlling the shooting time. In other words, for example, based on shooting instructions transmitted simultaneously from the synchronous shooting controller 100, the image data obtained by the camera devices 200 shooting upon receiving the shooting instructions may be grouped in the HEIF file. Alternatively, for example, in a situation where a plurality of camera devices (shooting units) are operated independently without forming a synchronous shooting system, the image data obtained by shooting at the same time may be grouped in an HEIF file.

Here, the time synchronization among the devices need not be implemented in the manner of the synchronous shooting system according to the present embodiment. That is, in the synchronous shooting system according to the present embodiment, the synchronous shooting controller 100 is described as having a grand master clock function and time-synchronizing the camera devices 200 belonging to the system, but the reference time for synchronization may be supplied by an external device. In other words, the device that obtains the image data and generates the HEIF file need not be the device that supplies the reference time for synchronization, and at least the time synchronization of the plurality of camera devices that shoot images may be achieved through time-synchronous communication with any device. To rephrase, the generation of HEIF files according to the present disclosure can be realized using image data shot by any device that is time-synchronized using the same method, in addition to image data shot by the camera devices 200 belonging to the synchronous shooting system.

Accordingly, the 'meta' box 402 may be configured to be capable of storing information indicating the respective shooting times (shooting timestamps) for the image data stored in the 'mdat' box 412. The shooting timestamp may be obtained, for example, from the shooting information (including the device error information) that is provided in association with the image data and stores various information pertaining to the shooting of the image data. The information pertaining to the image data is stored by defining (601) the data structure of the 'iinf' box 406 as illustrated in FIG. 6.

As illustrated in FIG. 6, the definition 601 includes an entry number 602 (16 or 32 bits) indicating the number of image items to be stored in the 'mdat' box 412, and an ItemInfoEntry ('infe') array 603 that stores various information pertaining to each image item. The 'infe' array 603 is an array having as many data as the entry number 602, and stores various information about each of the image items.

The data structure of 'infe' for a single image item may be defined (701) as illustrated in FIG. 7. As illustrated in FIG. 7, the definition 701 defines basic information 702 such as the item ID of the image item, the item type indicating the type of the image item, the item name of the image item, and the like, as well as timestamp information 703 describing the shooting timestamp. In the example in FIG. 7, the timestamp information 703 stores the shooting timestamp as a 64-bit integer value for the number of elapsed seconds in Coordinated Universal Time (UTC) in item_ts_sec and a 32-bit integer value for nanoseconds less than integer seconds in item_ts_nsec. The description format of the timestamp information 703 is not limited thereto, and for example, the information may describe the shooting timestamp in NTP timestamp format with a 32-bit second value and a 32-bit nanosecond value. Alternatively, International Atomic Time (TAI) may be used to describe the shooting timestamp in the form of a PTP timestamp with a 48-bit second value and a 32-bit nanosecond value.

By making it possible to store the shooting timestamp of each instance of image data in the 'meta' box 402 in this manner, grouping can also be performed using the shooting timestamp of the image data already stored in the 'mdat' box 412. In this aspect, for example, rather than using a configuration that stores the specified shooting time in the reference time information 505 in the 'tsyn' box 411, the shooting timestamp of the image data may be specified as the reference time for the synchronous group by describing the item ID of the image data. In this case, the synchronization error information 506 may store the maximum value of the time differences in the shooting times (shooting timestamps) between the image data specified in the reference time information 505 and other image data in the synchronous group. The permissible error information 507 may describe conditions under which image data can be included in the synchronous group in the form of an upper limit value for the time difference from the shooting time of the image data specified in the reference time information 505.

File Generation Sequence

Figure 8:
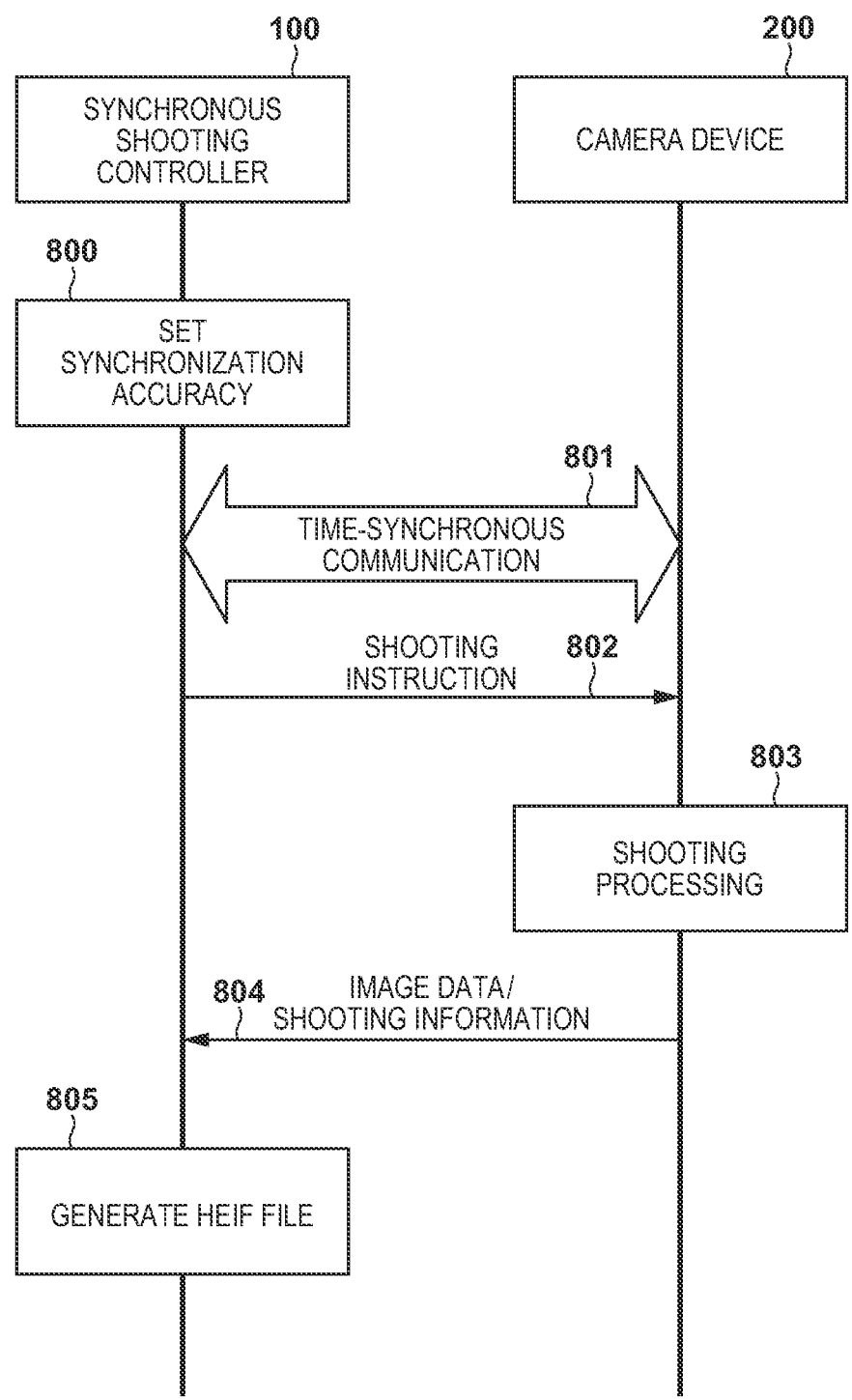
FIG. 8 is a diagram illustrating an example of a file generation sequence in the synchronous shooting system according to the embodiment and variation of the present disclosure.

The following will describe, with reference to FIG. 8, specific processing for a file generation sequence for generating an HEIF file storing a plurality of instances of image data shot synchronously in the synchronous shooting system according to the present embodiment. As illustrated in FIG. 8, the file generation sequence is implemented by the synchronous shooting controller 100 and the camera devices 200 performing the corresponding processing, i.e., the CPU 101 and the camera CPU 201 executing the corresponding processing. The sequence for the camera devices 200 illustrated in FIG. 8 is executed by each of the camera devices 200a to 200d communicating with the synchronous shooting controller 100.

In step 800, the synchronization accuracy of the shooting of image data is set for one synchronous group defined in the HEIF file generated in the synchronous shooting controller 100. "Setting the synchronization accuracy of the shooting" refers to determining the permissible upper limit value of the synchronization error of the camera devices 200 as a determination reference for grouping in the synchronous shooting system according to the present embodiment. The permissible upper limit value is also stored in the 'tsyn' box 411 of the generated HEIF file as the permissible error information 507. Here, the synchronization accuracy of the shooting may be set, for example, based on operation input by the user for selecting the intended use of the generated HEIF file, an operation input specifying an application that uses the HEIF file, or the like. Alternatively, a numerical value input is accepted for the permissible upper limit value of the synchronization error required when compositing image data included in the synchronous group, and the setting may be made based on the input numerical value. In addition to this, the synchronization accuracy of the shooting may be defined in a fixed manner, for example, for the synchronous shooting system.

In step 801, time-synchronous communication is performed between the synchronous shooting controller 100 and the camera devices 200, and the system timers of the devices are synchronized. As described above, in the synchronous shooting system according to the present embodiment, the synchronous shooting controller 100 has a PTP grand master clock function, and thus the times of the system timers of the camera devices 200 are synchronized to the grand master clock through the time-synchronous communication. In the descriptions of the file generation sequence in FIG. 8, the time-synchronous communication is assumed to be executed only in step 801 to facilitate understanding of the present disclosure, but the implementation of the present disclosure is not limited thereto, and time-synchronized communication may be performed at a predetermined frequency. In the camera device 200, when time-synchronous communication is performed, a PTP offset value used to adjust the system timer or the hardware clock is stored.

Figure 9:
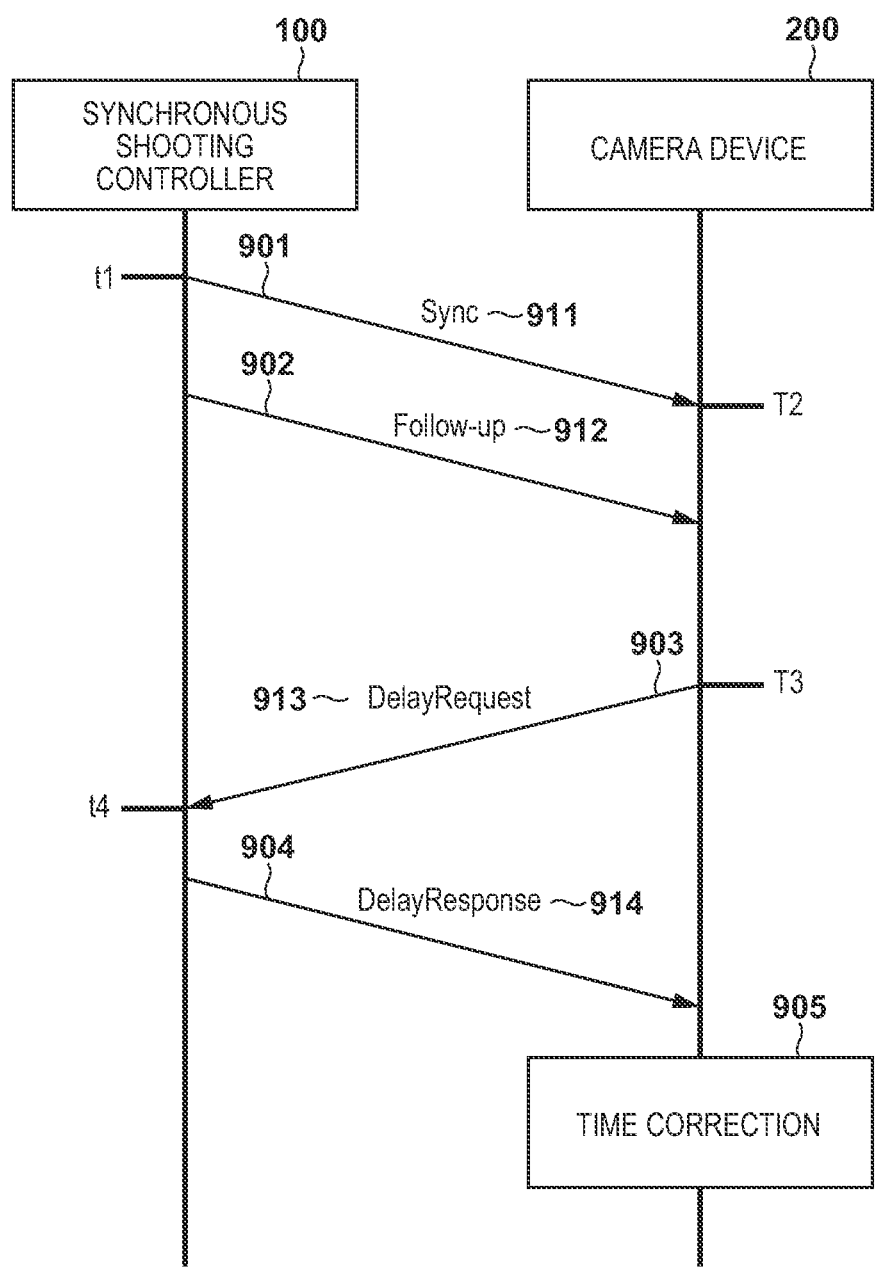
FIG. 9 is a diagram illustrating an example of a sequence of time-synchronous communication in the synchronous shooting system according to the embodiment and variation of the present disclosure.

Here, the time-synchronous communication sequence performed in this sequence will be described in detail with reference to FIG. 9. As illustrated in FIG. 9, the time-synchronous communication is implemented by the synchronous shooting controller 100 and the camera devices 200 performing the corresponding processing, i.e., the CPU 101 and the camera CPU 201 executing the corresponding processing. Like the file generation sequence (FIG. 8), the sequence for the camera devices 200 illustrated in FIG. 9 is executed by each of the camera devices 200a to 200d communicating with the synchronous shooting controller 100.

In step 901, a Sync message 911 is multicast from the synchronous shooting controller 100 to the other devices (camera devices 200) included in the synchronous shooting system. At this time, a transmission timestamp (transmission time t1) is stored in the RAM 103, for example, based on the output of the hardware clock built into the communication control unit 108 of the synchronous shooting controller 100. When the transmitted Sync message 911 is received by the camera device 200, a reception timestamp (reception time T2) is stored in the camera RAM 203, for example, based on the output of the hardware clock built into the camera communication control unit 208.

Then, in step 902, a Follow-up message 912 is multicast from the synchronous shooting controller 100 to the other devices (camera devices 200) included in the synchronous shooting system. The Follow-up message 912 includes the transmission time t1. When the transmitted Follow-up message 912 is received by the camera device 200, the transmission time t1 included in the message is stored in the camera RAM 203. In other words, the transmission time t1 of the Sync message 911 in the grand master clock is transmitted to the camera devices 200 through the Follow-up message 912.

In step 903, a DelayRequest message 913 is transmitted from the camera device 200 to the synchronous shooting controller 100. At this time, a transmission timestamp (transmission time T3) is stored in the camera RAM 203, for example, based on the output of the hardware clock built into the camera communication control unit 208 of the camera devices 200. When the transmitted DelayRequest message 913 is received by the synchronous shooting controller 100, a reception timestamp (reception time t4) is stored in the RAM 103, for example, based on the output of the hardware clock built into the communication control unit 108.

Then, in step 904, a DelayResponse message 914 is transmitted from the synchronous shooting controller 100 to the camera device 200 that transmitted the DelayRequest message 913. The DelayResponse message 914 includes the reception time t4. When the transmitted DelayResponse message 914 is received by the camera device 200, the reception time t4 included in the message is stored in the camera RAM 203. In other words, the reception time t4 of the DelayRequest message 913 in the grand master clock is transmitted to the camera devices 200 through the DelayResponse message 914.

In step 905, the time difference (PTP offset value) between the hardware clocks of the camera devices 200 and the synchronous shooting controller 100 is derived in the camera device 200 and stored in the camera RAM 203. Based on the derived PTP offset value, the time of the hardware clock of the camera communication control unit 208 is corrected, and based on the corrected hardware clock, the system timer of the camera CPU 201 is corrected to complete the time synchronization. Here, the PTP offset value can be derived as follows.

$$(\text{PTP offset value}) = ((T2-t1)-(t4-T3))/2$$

By doing so, time synchronization between the synchronous shooting controller 100 and the camera devices 200 is achieved.

Note that the system timer of the synchronous shooting controller 100 and the system timers of the camera devices 200 are temporarily synchronized through the time-synchronous communication, but strictly speaking, these can still be out of sync even after the time synchronization. Additionally, the PTP offset value can fluctuate each time the time-synchronous communication is executed. Therefore, it is assumed that the camera device 200 stores and holds the PTP offset values for a plurality of instances of time-synchronous communication in the camera RAM 203.

When the time-synchronous communication is complete, in step 802, the synchronous shooting controller 100 transmits shooting instructions for synchronous shooting to the camera devices 200, along with information on the specified shooting time. Note that in the present embodiment, the camera device 200 is described as shooting images in response to the supply of information on the specified shooting time, but as described above, the implementation of the present disclosure is not limited thereto.

In step 803, the camera device 200 executes the shooting processing at the specified shooting time. The shot image obtained by the shooting processing is encoded by the camera codec 205 and stored as image data.

In step 804, the image data generated in step 803 is transmitted from the camera device 200 to the synchronous shooting controller 100 along with the shooting information. In the present embodiment, the shooting information transmitted along with the image data is assumed to include device synchronization method information that identifies the time synchronization method performed in the corresponding camera device 200, the shooting timestamp of the image data, and device error information.

The device synchronization method information is information that identifies the time synchronization method used for the device that shot the image data. The device synchronization method information includes, for example, a UUID to identify the synchronous shooting system and the synchronous shooting performed, a protocol type, and a clock master used as a reference for the time synchronization. Here, in the synchronous shooting system according to the present embodiment, PTP communication is used for time synchronization, and the protocol type therefore indicates IEEE 1588-2008. The clock master information also indicates the value of a ClockIdentity field in the PTP Sync message 911 received in the time-synchronous communication. The field value indicates an identifier of the PTP grand master clock.

The shooting timestamp indicates, for the image data, the shooting timing (shooting time) when the shooting processing in step 803 is executed. Here, the shooting timestamp indicates the time when the image data was shot, as indicated by the system timer of the camera device 200 that shot the image data. In the synchronous shooting system according to the present embodiment, the shooting processing is performed based on the specified shooting time supplied from the synchronous shooting controller 100, and thus the shooting timestamps pertaining to the image data transmitted from the camera devices 200 in the system will match.

The device error information also indicates the PTP offset value derived for the camera device 200 that shot the image data. As mentioned above, because the PTP offset value can vary each time PTP time-synchronous communication is performed, the device error information may store, for example, a value that is the median rank when the PTP offset values derived a plurality of times in the past are sorted (a moving median value). That is, for PTP offset values obtained for the last nine instances of PTP time-synchronous communication, the fifth-ranked value is stored in the device error information. However, the PTP offset value stored in the device error information is not limited to the moving median value, and a value obtained based on one or more derivation results may be stored.

In step 805, an HEIF file is generated by the synchronous shooting controller 100 based on the plurality of instances of image data received in the synchronous shooting. At this time, the grouping processing is performed based on the information on the synchronization accuracy of shooting set in step 800 and the shooting information pertaining to the received plurality of instances of image data, and the synchronous group information 502 and indicator information 503 are configured. This information is stored in the 'tsyn' box 411 of the generated HEIF file.

Synchronous Shooting Processing

Figure 10:
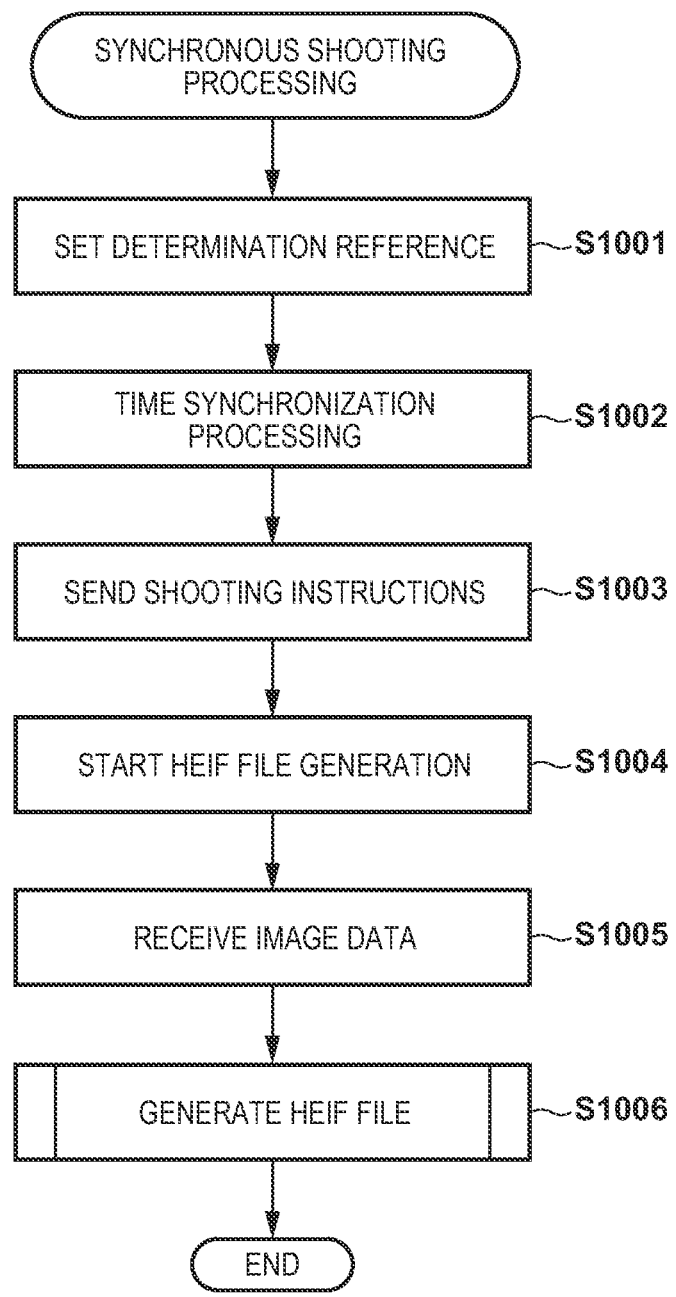
FIG. 10 is a flowchart illustrating an example of synchronous shooting processing performed in the synchronous shooting controller 100 according to the embodiment of the present disclosure.

An example of the synchronous shooting processing executed by the synchronous shooting controller 100 in such a file generation sequence will be described in detail hereinafter with reference to the flowchart in FIG. 10. The processing corresponding to the flowchart can be realized by, for example, the CPU 101 reading out a corresponding processing program stored in the ROM 102, for example, loading the program into the RAM 103, and executing the program. This synchronous shooting processing will be described, for example, as being started when an operation input pertaining to the execution of synchronous shooting is detected by the synchronous shooting controller 100.

To simplify the descriptions, the present embodiment will be described assuming that one HEIF file is generated by one instance of synchronous shooting processing. The plurality of instances of image data obtained by shooting in each of the camera devices 200 of the synchronous shooting system in response to shooting instructions for synchronous shooting are assumed to be stored in the 'mdat' box 412 of a single HEIF file. In addition, only one synchronous group is assumed to be defined in the single generated HEIF file. However, the implementation of the present disclosure is not limited thereto. In other words, a plurality of HEIF files may be generated by a single instance of synchronous shooting processing; not all of the plurality of instances of image data obtained in response to a shooting instruction may be stored in an HEIF file; and a plurality of synchronous groups may be defined in a single HEIF file.

In step S1001, the CPU 101 sets the synchronization accuracy for one synchronous group defined in the HEIF file to be generated, for the shooting pertaining to that group. More specifically, the CPU 101 sets the permissible upper limit value of the PTP offset value to be used as the determination reference for the grouping. As described above, the CPU 101 may set this permissible upper limit value, for example, based on operation input by the user for selecting the intended use of the generated HEIF file, an operation input specifying an application that uses the HEIF file, or the like. Alternatively, a numerical value input is accepted for the permissible upper limit value of the synchronization error required when compositing image data included in the synchronous group, and the CPU 101 may make the setting based on the numerical value.

In step S1002, the CPU 101 performs time synchronization processing to synchronize the times of the camera devices 200a to 200d through PTP communication. The time synchronization processing may be executed, for example, until the times of all the camera devices 200 in the synchronous shooting system are synchronized with the time of the hardware clock built into the synchronous shooting controller 100. Here, the time synchronization between the synchronous shooting controller 100 and the camera devices 200 may be determined based on the synchronization accuracy of the shooting set in step S1001. For example, the CPU 101 may communicate with each camera device 200 to inquire whether the derived PTP offset value is a value that meets the synchronization accuracy for shooting, and determine the time synchronization as a result.

In step S1003, the CPU 101 sends shooting instructions for synchronous shooting to each of the camera devices 200 in the synchronous shooting system. Here, the shooting instructions for synchronous shooting include a 128-bit UUID for identifying the synchronous shooting system and the synchronous shooting, and information on the specified shooting time.

In step S1004, the file generation unit 104 generates a new HEIF file for the current synchronous shooting under the control of the CPU 101. The HEIF file does not contain any image data and some of the information at the point in time when this step is performed, but the 'tsyn' box 411 and some of the information can be configured and stored. For example, in this step, the information is stored for part of the indicator information 503 in the 'tsyn' box 411. Specifically, the file generation unit 104 stores, in the synchronization method information 504, information specifying the time synchronization standard IEEE 1588-2008, the UUID transmitted in step S1003, and the identifier of the PTP grand master clock communicated in the time-synchronous communication. The file generation unit 104 also stores the information on the specified shooting time transmitted in step S1003 in the reference time information 505. The file generation unit 104 also stores the permissible upper limit value of the PTP offset value set in step S1001 in the permissible error information 507.

Thereafter, when each of the camera devices 200 reaches the specified shooting time, shooting is performed, and the image data obtained by shooting is transmitted to the synchronous shooting controller 100 as the shooting information. Accordingly, in step S1005, the CPU 101 stores the image data and the shooting information from each camera device 200 received via the communication control unit 108 in the RAM 103.

In step S1006, under the control of the CPU 101, the file generation unit 104 configures each instance of information in the 'tsyn' box 411 to define a synchronous group while storing the received image data in the HEIF file, and completes the HEIF file.

The processing executed in this step (the storage of image data and the configuration of the 'tsyn' box 411) will be described in detail with reference to the flowchart in FIG. 11. The processing illustrated in the flowchart is executed for each set of image data and shooting information received from the camera devices 200, and is therefore executed for as many camera devices 200 as there are in the synchronous shooting system.

In step S1101, the file generation unit 104 stores the image data to be processed as an image item (a target image item) in the 'mdat' box 412 of the HEIF file. At this time, the file generation unit 104 determines the item ID of the target image item. The file generation unit 104 then configures the 'infe' for the image item, and updates the 'iinf' box 406 while updating the entry number 602 to the number of image items stored in the 'mdat' box 412. When configuring the 'infe' for the target image item, a shooting timestamp based on the shooting information received in association with the image data is stored.

In step S1102, the file generation unit 104 refers to the shooting information received along with the target image item (target shooting information) and determines whether the time synchronization method used to shoot the target image item and the shooting timestamp match the information in the 'tsyn' box 411. Specifically, the file generation unit 104 determines whether information on the time synchronization method and the shooting timestamp in the target shooting information match the synchronization method information 504 and the reference time information 505 contained in the 'tsyn' box 411 of the HEIF file being generated. Here, in the synchronous shooting system according to the present embodiment, the shooting processing is performed in the camera devices 200 having had the specified shooting time supplied, and thus the shooting timestamps match the specified shooting time in the reference time information 505. The file generation unit 104 moves the sequence to step S1103 if this information is determined to match the information in the 'tsyn' box 411, and ends the processing of this flow without updating the information in the 'tsyn' box 411 if the information does not match.

In step S1103, the file generation unit 104 determines whether the target image item meets the synchronization accuracy (determination reference) for shooting. More specifically, the file generation unit 104 makes the determination based on the PTP offset value (in the camera device 200 that shot the target image item) contained in the target shooting information and the permissible error information 507 in the 'tsyn' box 411 of the HEIF file being generated. In other words, the file generation unit 104 determines whether the synchronization accuracy of the shooting is met according to whether the PTP offset value is within the permissible upper limit value indicated by the permissible error information 507 (e.g., that the absolute value of the PTP offset value does not exceed the permissible upper limit value). The file generation unit 104 moves the sequence to step S1104 if the target image item is determined to meet the synchronization accuracy for shooting, and ends the processing of this flow if not. In this manner, in this synchronous shooting system, after the condition that the time synchronization method and shooting timestamp are the same in step S1102 is set, a further determination is made in step S1103 as to whether to group the images based on the time synchronization error.

In step S1104, the file generation unit 104 performs processing for including the target image item in the synchronous group for synchronous shooting. Specifically, the file generation unit 104 updates the synchronous group information 502 in the 'tsyn' box 411 by adding the item ID of the target image item as an entry. The file generation unit 104 also updates (the absolute value of) the PTP offset value of the camera device 200 that shot the target image item if that PTP offset value is greater than the current value of the synchronization error information 506. Here, the synchronization error information 506 has an initial value of 0, and when the absolute value of the PTP offset value for the target image item is high, is updated to that value. In this manner, the file generation unit 104 can complete the HEIF file by configuring the synchronous group information 502 and the indicator information 503 for the synchronous group defined in the HEIF file to be generated.

Accordingly, by executing step S1006 of the synchronous shooting processing, an HEIF file is generated that groups the image data, among the received image data, which meets the synchronization accuracy of shooting. In other words, the generated HEIF file defines a synchronous group that ensures the synchronization accuracy of shooting that has been set, and is configured including information making it possible to evaluate the simultaneity of shooting for the plurality of instances of image data in the synchronous group.

Use of HEIF File

The manner in which the HEIF file generated in this way is used will be described next. Here, it can easily be understood that the HEIF file can be used in any device, including, but not limited to, the synchronous shooting controller 100 that generated the file. In use, a processor of the device such as a CPU reads out the 'meta' box 402 of the HEIF file to be processed to reproduce or change the image data stored in the 'mdat' box 412, edit the 'meta' box 402 as necessary, and the like.

One aspect of the use of the HEIF file includes presenting, based on the information about the synchronous group defined in the 'syn' box 411 of the HEIF file, the synchronization accuracy of the shooting for the plurality of instances of image data included in the synchronous group. The presentation of the synchronization accuracy of the shooting may, for example, be in the form of displaying at least one instance of information in the indicator information 503 of the HEIF file, or displaying the HEIF file if the required synchronization accuracy is met.

In the former case, for example, a display may be made indicating that at least the synchronization accuracy of shooting indicated by the permissible error information 507 is ensured in the image data in the group, with respect to the shooting time indicated by the reference time information 505. Or, for example, a display may be made indicating that the image data of the group was shot within the time difference indicated by the synchronization error information 506.

In the latter case, for example, when the synchronization accuracy of shooting is set as an extraction condition in a file viewing application, an HEIF file that meets the extraction condition may be displayed based on the information in the synchronization error information 506 or the permissible error information 507. Alternatively, for example, in an application that performs compositing processing using image data shot synchronously, an HEIF file that satisfies the synchronization accuracy required for the compositing processing may be displayed based on the information in the synchronization error information 506 or the permissible error information 507.

When presenting the synchronization accuracy for these synchronous groups, some or all of the plurality of instances of image data, classified into synchronous groups defined by the synchronous group information 502, may be further presented.

Another aspect of the use of HEIF files includes, when new image data is added to the HEIF file (stored in the 'mdat' box 412), determining to add the new image data to the synchronous group. For example, when an instruction is given to add new image data to an HEIF file, a determination is made as to whether a predefined synchronous group is present by referring to the 'tsyn' box 411. If such a group is present, a determination is made as to whether the new image data can be added to the synchronous group (grouping) by comparing the shooting information associated with the new image data and the indicator information 503.

This determination may be made, for example, in the same manner as the processing flow illustrated in FIG. 11. In other words, the determination to add the new image data to the synchronous group is made under the assumption that the information on the time synchronization method of the device that shot the new image data and the shooting timestamp of the new image data are the same as the synchronization method information 504 and the reference time information 505 in the HEIF file. If these preconditions are met and the PTP offset value of the new image data at the time of the shooting falls within the range of the permissible upper limit value indicated by the permissible error information 507, then it is determined that the new image data can be added to the synchronous group. At this time, grouping is performed by adding information (the item ID) pertaining to the new image data to the synchronous group information 502. If the synchronization accuracy of the shooting for the image data in the group changes due to the addition of new image data to the synchronous group, the information in the synchronization error information 506 is updated. On the other hand, if the preconditions are not met, or are met but the PTP offset value does not fall within the range of the permissible upper limit value indicated by the permissible error information 507, then it is determined that the new image data cannot be added to the synchronous group.

Note that the addition of new image data to the synchronous group need not be performed on the condition that the time synchronization method and the shooting timestamp of the device that shot the image are the same as the synchronization method information 504 and the reference time information 505. For example, if the time synchronization method and the synchronization method information 504 are the same, the determination to add may be made by identifying the shooting time on a predetermined axis (master clock reference time axis) based on the shooting timestamp and the PTP offset value for the new image data. At this time, the shooting time in the common time axis of the synchronous group defined in the HEIF file is the specified shooting time indicated by the reference time information 505. Accordingly, if the time difference between the shooting time pertaining to the new image data and the specified shooting time is within the permissible range of the synchronization error indicated by the permissible error information 507, then it may be determined that the image data can be added to the synchronous group. Even if the device that shot the new image data was not time-synchronized at the time of the shooting using the same method as that indicated by the synchronization method information 504 pertaining to the synchronous group, the time at the time of shooting may be estimated, and the determination to add be made, based on, for example, information indicating time synchronization performed at any timing after the shooting.

As described thus far, for a synchronous group defined in an HEIF file according to the present embodiment, the convenience of the image data included in a group can be increased by including the permissible error information 507, which indicates the synchronization accuracy of the shooting. More specifically, including the permissible error information 507 for a synchronous group makes it possible to quantitatively indicate the degree to which the image data included in the group is image data that was shot synchronously with respect to time, which in turn makes it easier to determine whether the group is suitable for the intended use. In addition, grouping conditions are indicated by the indicator information 503, which includes the permissible error information 507, and it is therefore easy to determine whether a predefined synchronous group is updated when image data is added to the HEIF file.

In the HEIF file generation according to the present embodiment, all received image data is described as being stored in the 'mdat' box 412 even if that image data is not added to the synchronous group, but the image data may not be stored if that image data is not added to a synchronous group.

Variations

The foregoing embodiment described an example of an HEIF file containing synchronous group information, which indicates the grouping of a plurality of instances of image data shot in a time-synchronized manner, and permissible error information, which indicates the synchronization accuracy or a grouping index for the shooting of the plurality of instances of image data. However, as mentioned above, the implementation of the present disclosure need not be limited to HEIF format files, and can be applied to any file constituted by indicator information including synchronous group information and permissible error information.

For example, the present disclosure can also be applied in a form in which a plurality of camera devices 200 in a synchronous shooting system each shoots a moving image and stores a plurality of instances of moving image data obtained in a single file. In other words, according to the present disclosure, a single video file can be generated which stores a plurality of instances of moving image data and contains, as metadata, synchronous group information that groups and defines the moving image data shot synchronously with respect to time and indicator information serving as a reference for the grouping. At this time, the generated moving image file may be in a file format based on ISO Base Media File Format (ISOBMFF), similar to HEIF. For example, in a form where the camera devices 200 generate moving image data encoded in H.264, the synchronous shooting controller 100 may use an MP4 file that stores the moving image data shot by each camera device 200 as different video tracks and audio tracks.

In MP4 files, metadata is described in a MovieBox ('moov'), and thus the 'tsyn' box in 'moov' can be included to describe the grouping of tracks. Note that the list of entry IDs in the 'tsyn' box may specify track IDs. In the case of moving image data, the shooting timestamp is the start time of moving image shooting by each camera device 200, and can be stored in a TrackHeaderBox ('tkhd') box in 'moov'. The indicator information may be stored in the 'tsyn' box, for example, as in the embodiment described above.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-133672, filed Aug. 18, 2021, which is hereby incorporated by reference herein in its entirety.

What is claimed is:

1. An image processing apparatus that generates an image file having a structure including a first storage region and a second storage region, the first storage region storing a plurality of instances of image data and the second storage region storing metadata pertaining to the plurality of instances of image data,
wherein
the image processing apparatus comprises at least one processor to function as the following units:
an obtainment unit configured to obtain a plurality of instances of image data and shooting information pertaining to shooting of the image data;
a determination unit configured to determine, for each of the plurality of instances of image data obtained by the obtainment unit, whether the image data has been shot synchronously with respect to time, based on the shooting information pertaining to the image data and the determination reference indicating whether the image data has been shot synchronously with respect to time;
a first configuration unit configured to configure the synchronous group information grouping the image data determined by the determination unit to have been shot synchronously with respect to time, the synchronous group information indicating image data belonging to a group created by the grouping;
a second configuration unit configured to configure indicator information indicating an indicator of grouping for the group indicated by the synchronous group information, the indicator information including at least information of the determination reference; and
a generation unit configured to generate the image file storing the plurality of instances of image data obtained by the obtainment unit, metadata including the synchronous group information configured by the first configuration unit and the indicator information configured by the second configuration unit.

2. The image processing apparatus according to claim 1, further comprising:
a specifying unit configured to specify a reference time of shooting, for the group indicated by the synchronous group information,
wherein the determination reference defines a time range which is considered to be synchronous, with respect to time, relative to the reference time.

3. The image processing apparatus according to claim 2, wherein the plurality of instances of image data obtained by the obtainment unit are image data shot by a plurality of devices having internal clocks that have undergone time synchronization through a common synchronization method,
the plurality of instances of image data are image data shot by each of the plurality of devices when the internal clocks of the devices are at the reference time,
the shooting information for one instance of the image data includes information of synchronization error of the internal clock of the device that shot the one instance of the image data relative to a master clock serving as a reference for the time synchronization, and
the determination reference defines the time range in a form of a permissible upper limit value of the synchronization error relative to the master clock.

4. The image processing apparatus according to claim 3, further comprising:
the master clock serving as the reference for the time synchronization; and
a time synchronization unit configured to time-synchronize the internal clocks of the plurality of devices based on the master clock.

5. The image processing apparatus according to claim 3, wherein the synchronization method is based on the IEEE 1588-2008 time synchronization standard.

6. The image processing apparatus according to claim 3, wherein the indicator information further includes synchronization method information indicating the synchronization method.

7. The image processing apparatus according to claim 2, wherein the plurality of instances of image data obtained by the obtainment unit are image data shot by a plurality of devices having internal clocks that have undergone time synchronization through a common synchronization method, the shooting information for one instance of the image data includes information of a shooting time of the internal clock of the device that shot the one instance of the image data, the specifying unit specifies the shooting time of one instance of image data among the plurality of instances of image data as the reference time, and the determination reference defines the time range in a form of a permissible upper limit value of a time difference from the reference time.

8. The image processing apparatus according to claim 2, wherein the indicator information further includes reference time information indicating the reference time.

9. The image processing apparatus according to claim 1, wherein the image data stored in the first storage region is at least one of a still image or a moving image.

10. The image processing apparatus according to claim 1, wherein a file format of the image file is High Efficiency Image File Format (HEIF) or ISO Base Media File Format (ISOBMFF).

11. A non-transitory computer-readable storage medium in which is stored a program for causing a computer to function as the respective units of the image processing apparatus according to claim 1.

12. A control method for an image processing apparatus that generates an image file having a structure including a first storage region and a second storage region, the first storage region storing a plurality of instances of image data and the second storage region storing metadata pertaining to the plurality of instances of image data, wherein the control method comprises:

obtaining a plurality of instances of image data and shooting information pertaining to shooting of the image data;

determining, for each of the plurality of instances of image data obtained, whether the image data has been shot synchronously with respect to time, based on the shooting information pertaining to the image data and the determination reference indicating whether the image data has been shot synchronously with respect to time;

configuring the synchronous group information grouping the image data determined to have been shot synchronously with respect to time, the synchronous group information indicating image data belonging to a group created by the grouping;

configuring indicator information indicating an indicator of grouping for the group indicated by the synchronous group information, the indicator information including at least information of the determination reference; and generating the image file storing the plurality of instances of image data obtained, metadata including the synchronous group information and the indicator information.

* * * * *